BAND FOLDING FREQUENCY CONVERSION SYSTEM

Filed Jan. 23, 1962 3 Sheets-Sheet 1

William D. Gabor
*INVENTOR*

William D. Gabor
*INVENTOR*

April 26, 1966 W. D. GABOR 3,248,653

BAND FOLDING FREQUENCY CONVERSION SYSTEM

Filed Jan. 23, 1962 3 Sheets-Sheet 3

William D. Gabor
*INVENTOR*

United States Patent Office 3,248,653

Patented Apr. 26, 1966

3,248,653
BAND FOLDING FREQUENCY CONVERSION SYSTEM

William D. Gabor, Wilton, Conn., assignor to Sanders Associates, Inc., Nashua, N.H., a corporation of Delaware Filed Jan. 23, 1962, Ser. No. 168,075
7 Claims. (Cl. 325—435)

This invention relates in general to frequency conversion apparatus and more particularly pertains to a frequency conversion device capable of converting all types of modulated RF signals, whether frequency modulated, amplitude modulated, continuous wave, or otherwise, occurring over a wide band to a greatly compressed band while preserving all the modulation characteristics.

Detection of radio frequency signals which may occur anywhere in a wide band of frequencies and which may be modulated in various ways has in the past been performed by employing many staggered multi-channel receivers designed for one particular type of modulation. In such an arrangement, some receivers are designed to detect amplitude modulated signals while other receivers are required to detect frequency modulated signals occurring in the same frequency range. For continuous monitoring of the entire radio spectrum to determine in what portion of the spectrum radio frequency signals exist, conventional monitoring techniques require a large array of receivers.

The invention is directed to a band folding system for converting any form of RF signal to the audio frequency range while retaining the original modulated form. This is accomplished by translating the signal spectrum (that is, the carrier and modulation components) to a lower frequency region so that the resultant signal can be accommodated in a relatively low frequency storage device. The stored signal can subsequently be completely detected by reconverting the signal spectrum to a higher frequency for proper demodulation.

The principal object of the invention is to provide a band folding system, capable of monitoring a wide frequency band, in which the same equipment is used to convert all types of modulated radio frequency signals occurring in that band to a greatly compressed band, in a manner preserving the original modulation together with its converted carrier.

The invention makes use of a generator which produces a wide spectrum of line frequencies. By periodically actuating the generator at a rate determined by a clock, the line frequencies are caused to occur uniformly spaced at desired frequency intervals throughout the generated spectrum. Assuming a modulated signal to appear at any arbitrary portion of the monitored band, the density of line frequencies supplied by the generator is such that one line frequency in the generated spectrum will always be close to the frequencies covered by the signal spectrum. By mixing the signal spectrum with the line frequencies and selecting the difference frequency products, there is obtained a spectrum which contains a converted carrier and its modulation components. The resultant difference frequency signal then consists of the modulation envelope together with its converted carrier, and the signal, therefore, can be accommodated in a low frequency storage device. In the invention, signals from the monitored band are heterodyned in a mixer with the output of the generator, and the output of the mixer is passed through a filter to remove higher frequency modulation products, leaving only the difference frequency products. Because the filter has a low frequency cutoff point (that is, the filter will not pass those signals lying in frequency between d.c. and the filter's low frequency limit), that portion of the difference frequency products occurring below the filter's low frequency cutoff is lost. In order to remedy that gap, two signal channels are employed. The two signal channels are identical in construction, and in each channel the monitored signals are heterodyned as described above. However, the converted monitored signals in one channel are offset with respect to frequency from the converted monitored signals in the other channel. The difference in conversion frequencies of the two channels is such that when the filtered outputs of the two channels are added together, the gap that appears in the response of one channel is covered by the response of the other channel.

The invention, both as to its arrangement and its mode of operation, can be better understood from a perusal of the exposition which follows when considered in conjunction with the accompanying drawings in which.

Figure 1:
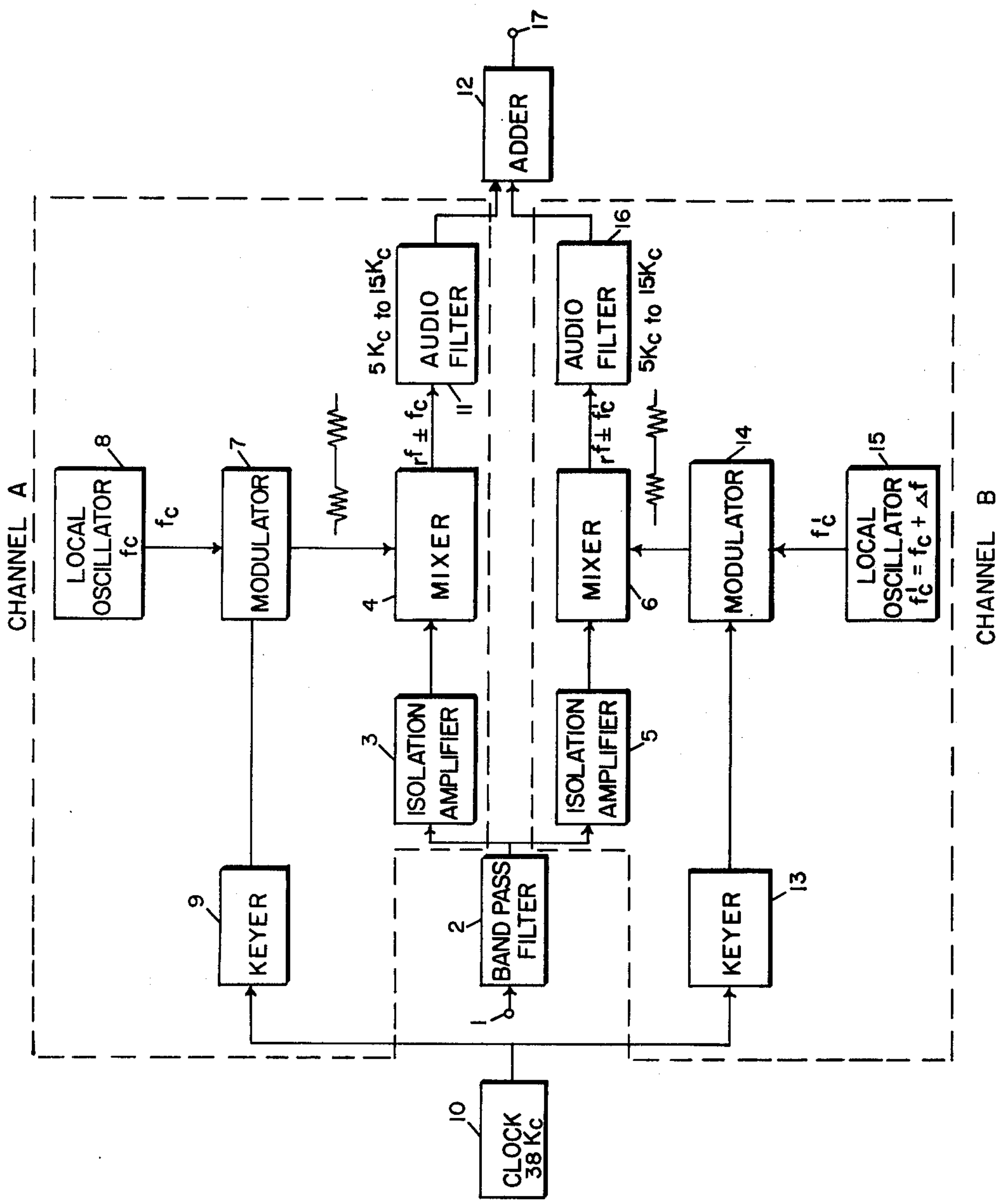
FIG. 1 depicts the schematic arrangement of an embodiment of the invention.
Figures 6, 7, 8:
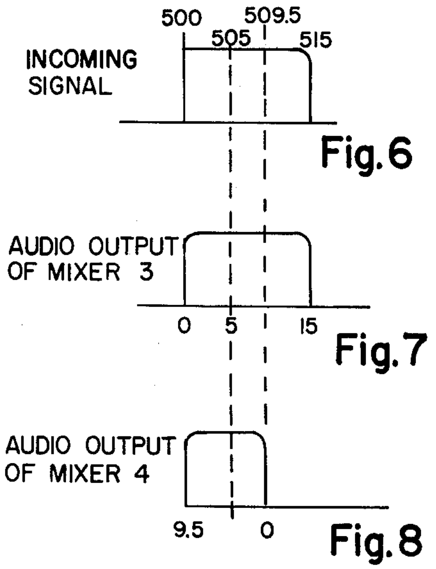
FIG. 6 depicts the frequency band occupied by a single side band amplitude modulated RF signal.
Figure 9:
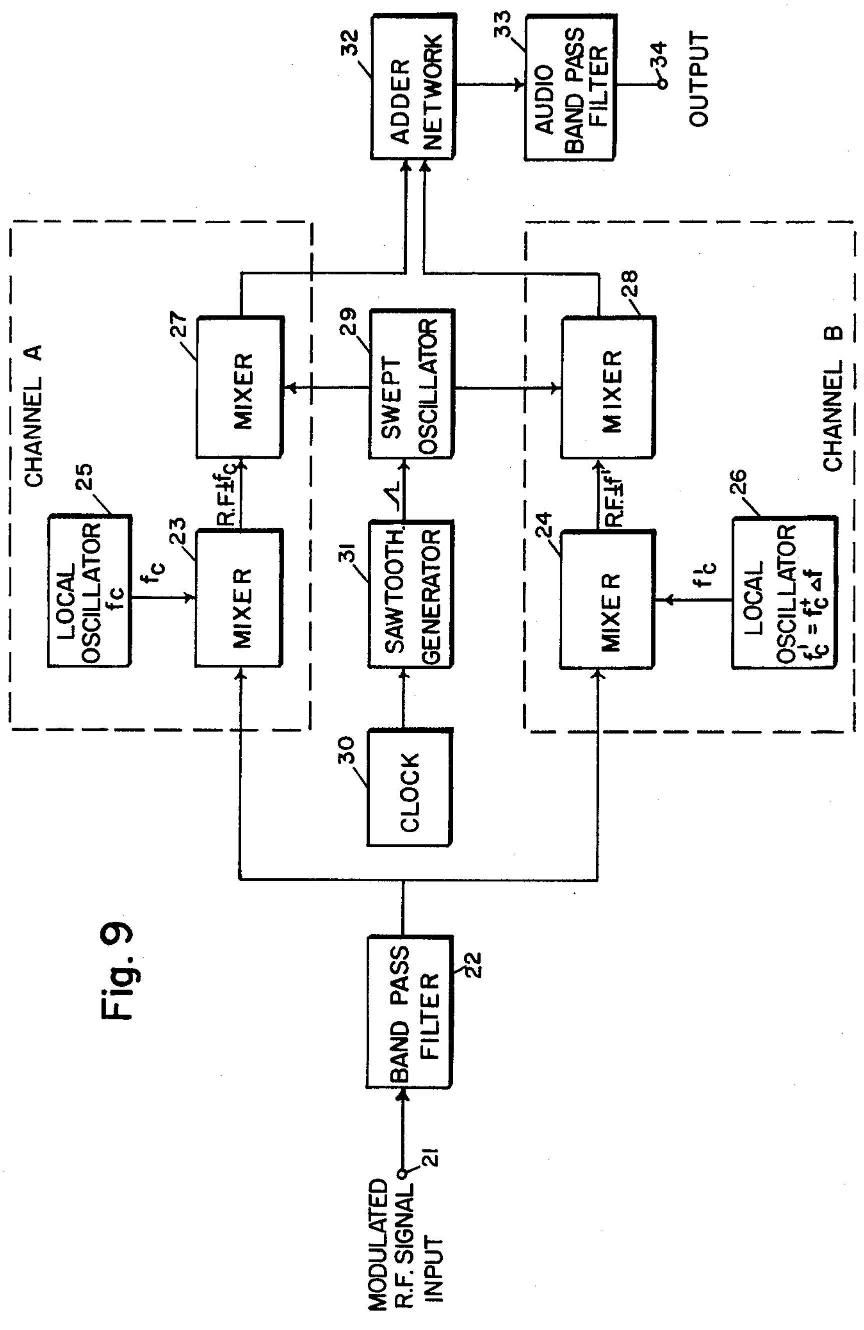

FIGS. 7 and 8 illustrate the outputs of mixers 3 and 4 when the signal of FIG. 6 is applied to the input terminal of the FIG. 1 embodiment; and FIG. 9 depicts the schematic arrangement of an alternative embodiment of the invention.

Referring now to FIG. 1, there is shown in block diagrammatic form an arrangement of components constituting an embodiment of the invention. In that embodiment, a band pass filter 2 has its input connected to a terminal 1 at which are impressed modulated radio frequency (RF) signals. The invention converts the RF signals to audio frequency signals while preserving the signal spectrum, that is, the carrier and its modulation components, and does this irrespective of the type of RF modulation. The radio frequency signals, for example, may be amplitude modulated, frequency modulated, continuous wave, interrupted continuous wave, or frequency shift keyed. Filter 2 passes only that band of frequencies in the spectrum which are to be monitored. For example, filter 2 may pass all frequencies in the band from 50 megacycles (mc.) to 100 mc. The output of band pass filter 2 is fed through an isolation amplifier 3 in channel A into a mixer 4 and through another isolation amplifier 5 in channel B into a similar mixer 6. In channel A, the output of filter 2 is heterodyned in mixer 4 with rectangular pulses applied to that mixer by a modulator 7. A local oscillator 8 provides a continuous input of frequency $f_c$ to modulator 7. A keyer 9 controls the repetition rate and pulse width of the pulses supplied by the modulator. The keyer may be a conventional blocking oscillator, for example, and is triggered by the output of a clock 10. The clock may be a crystal-controlled oscillator of conventional design. The heterodyned output of mixer 4 is applied to the input of an audio band pass filter 11, and the output of that filter is impressed upon an adder network 12.

The arrangement of apparatus in channel B is similar to the arrangement in channel A. Channel B has a keyer 13 triggered by the output of clock 10. The keyer controls a modulator 14 having the output of local oscillator 15 applied thereto. Local oscillator 15 continuously generates a signal having a frequency $f_c^1$ which is displaced in frequency from the oscillatory frequency $f_c$ of generator 8 by an amount $\Delta f$. The output of modulator 14 is a rectangular pulse of radio frequency energy oscillating at the frequency $f_c^1$, the pulse being produced at periodic intervals determined by the clock 10. The pulsed output of modulator 14 is heterodyned in mixer 6 with the signals passed by filter 2. The resultant output of mixer 6 is impressed upon an audio band pass filter 16 which has its output coupled to adder network 12. The output of audio filters 11 and 16 are combined in adder 12, and the combined signal appears at output terminal 17.

Figures 2, 3:
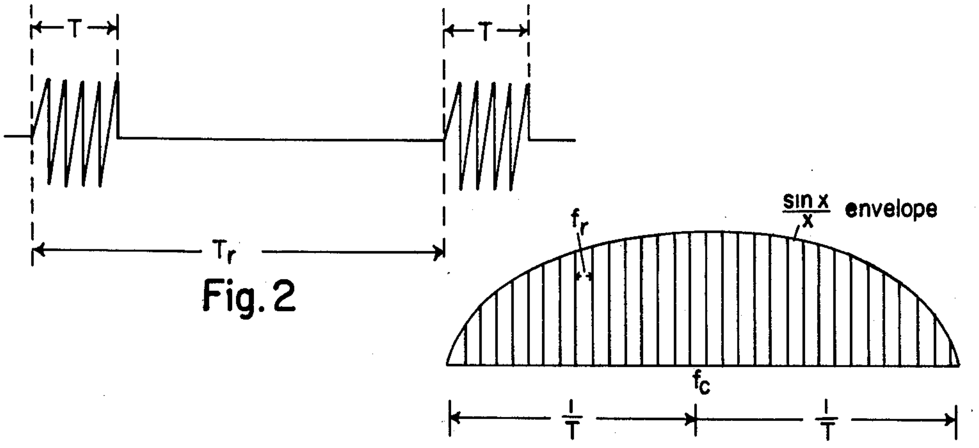
FIG. 2 shows periodic pulses of high frequency wave energy.
FIG. 3 illustrates the spectrum of line frequencies produced by the periodic pulses.

To apprehend the operation of the system depicted in FIG. 1, an understanding of the nature of the rectangular pulses of radio frequency energy supplied by modulators 7 and 14 is requisite. Fourier analysis is a helpful path to such an understanding. Fourier analysis, as is well known, is the resolution of arbitrary signals into sinusoidal components. Where the signal is a periodic rectangular pulse of the type shown in FIG. 2 having a carrier frequency $f_c$, a pulse duration T, and a pulse repetition period $T_r$, the frequency spectrum of the carrier frequency pulse can be readily determined by Fourier analysis. For such an analysis, the reader is referred to pages 346 to 349 of Principles of Radar, third edition, by Reintjes and Coate, published by McGraw-Hill. The frequency spectrum of the carrier frequency pulse is depicted in FIG. 3. In that spectrum, a sinusoidal wave of frequency $f_c$ is known as the carrier-frequency component. The other components make up the side bands. The upper side band is a set of sinusoidal waves of frequencies higher than $f_c$, and the lower side band is a set of sinusoidal waves of frequencies lower than $f_c$. Each component is shown as a line in the spectrum, but it should be realized that each line represents a sinusoidal wave train of constant frequency. Adjacent lines in the pulse spectrum are spaced apart in frequency by an amount equal to the pulse repetition frequency $f_r$. The envelope of the pulse spectrum is mathematically of the form sin $x/x$, and the spacing between zero amplitude points of the envelope is determined by the pulse duration T. It is important to observe that the pulse is the sum of Fourier components which are spectral "line" frequencies appearing at regular intervals over a large frequnecy range.

In the system of FIG. 1, the frequency of local oscillator 8 is chosen to be at the center of the band of frequencies to be monitored. The incoming signals at terminal 1 are, in essence, sampled when the pulsed outputs of the modulators 7 and 14 are applied to their respective mixers. The sampling rate is determined by the frequency of the signals emitted by clock 10. In order to preserve the data in the input signals appearing at terminal 1, the clock's frequency is arranged to be more than twice the highest frequency to which any portion of the signal is to be converted. For example, where a recording device is used whose upper frequency is 15 kc., a clock frequency above 30 kc. is required to assure retention of the data in the input signals. For the purpose of exposition, the frequency of clock 8 is arbitrarily assumed to be 38 kc.

The rectangular pulse output of modulator 7 in channel A may then be resolved into a spectrum of line frequencies of the type shown in FIG. 3. The carrier frequency component is a sinusoid of frequency $f_c$, and the line frequencies occur at 38 kc. intervals. The number of line frequencies appearing in that spectrum depends upon the duration T of the modulator's rectangular pulse. The shorter the pulse duration, the greater the number of line frequencies contained within the sin $x/x$ envelope. Modulator 7 can be considered to supply to mixer 4, simultaneously, a multitude of sinusoidal signals appearing at 38 kc. intervals over an extremely large frequency band. It is highly desirable in the invention to have all the spectral line frequencies of the same amplitude; therefore, filters may be used to exclude those spectral line frequencies occurring at the extremities of the $$\frac{\sin x}{x}$$

envelope.

In a similar manner, the rectangular pulse output of modulator 14 in channel B may be resolved into a spectrum of line frequencies in which the carrier frequency component is a sinusoid of frequency $f_c^1$ and in which the line frequencies occur at 38 kc. intervals.

The incoming signals passed by filter 2 are heterodyned in the mixer 4 of channel A with the line frequencies in the spectrum of the rectangular pulse. The resultant signals are fed into audio filter 11 which has a band width of approximately 5 kc. to 15 kc. so that only the difference frequency products are passed. Where the frequency of the incoming signal approaches any spectral line frequency closer than 5 kc., the difference frequency resulting from the heterodyning of the incoming signal with the line frequency is a frequency below 5 kc. That difference frequency is not within the pass band of audio filter 11 so that a gap appears in the response of channel A to incoming signals. To eliminate that gap, channel B is operated in conjunction with channel A. The center frequency $f_c^1$ of the local oscillator in channel B is shifted by an amount $\Delta f$ relative to the frequency $f_c$ of the local oscillator in channel A. For example, the center of frequency $f_c^1$ of local oscillator 15 is shifted so that it is 9.5 kc. higher than the frequency of oscillator 8. In channel B, therefore, the line frequency spectrum resulting from the pulse from modulator 14 is similar to the line frequency spectrum in channel A except that each line frequency spectrum in channel B is shifted upwardly by 9.5 kc. ($\Delta f$) in relation to its corresponding line frequency in channel A. By this arrangement, any information lost in the gap of channel A is carried through channel B to the adder 12.

It is highly important to prevent the spectral line frequencies produced by the modulator in one channel from feeding into the mixer of the other signal channel. To prevent such signal interaction between channels A and B, isolation amplifiers 3 and 5 are inserted before the mixers in their respective channels. The isolation devices are amplifiers of the type, for example, having a gain of 30 db in the forward direction (viz. from input toward output) and which attenuate signals in the reverse direction by 80 db. An attenuation pad of 30 db is connected to the amplifier's output so that while the signal into the amplifier is increased by 30 db, the amplifier's output is attenuated 30 db by the pad, resulting in no net forward gain (viz., the net forward gain is 0 db). Signals in one channel feeding in the reverse direction pass through the attenuation pad and the isolation amplifier and are attenuated by 110 db. By that arrangement, the front ends of the two signal channels are effectively isolated from one another. It is, of course, apparent that other apparatus may be employed to provide isolation between the signal channels, the most obvious of such apparatus being ferrite devices (viz., ferrite isolators) of the type permitting signal transmission in one direction only.

Figure 4:
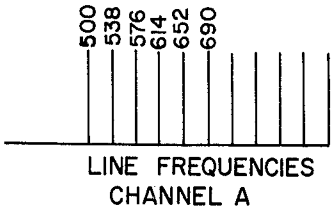
FIGS. 4 and 5 illustrate a portion of the line frequencies generated by periodic pulses in channels A and B of the FIG. 1 embodiment.
Figure 5:
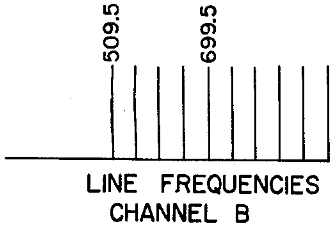

Assuming the clock frequency to be 38 kc. and the frequency $f_c$ of local oscillator 8 to be 690 kc., then the spectrum of the pulse produced by modulator 7 will have a spectral line frequency at 500 kc., as shown by FIG. 4. Since the spectrum of the pulse produced by modulator 14 in channel B has corresponding line frequencies which are $\Delta f$ (here assumed to be 9.5 kc.) higher in frequnecy than the line frequencies of channel A, the spectrum in channel B, a part of which is indicated in FIG. 5, has a line frequency at 509.5. Further, the incoming signal applied at terminal 1 to the system of FIG. 1 is assumed to be an amplitude modulated signal having a carrier frequency of 500 kc. with the upper side band extending to 15 kc. above the carrier as depicted in FIG. 6, the lower side band having been suppressed at the transmitter. The incoming signal is heterodyned in channel A with the 500 kc. line frequency resulting from the pulse output of modulator 7. The difference frequency output of mixer 4 results in an audio output extending from zero frequency (i.e., D.C.) to 15 kc. as shown by the response curve of FIG. 7. Since filter 11 passes only those frequencies between approximately 5 kc. and 15 kc., the output of mixer 4 lying somewhat below 5 kc. (below 4.5 kc., for example) is rejected by the filter and does not appear in the output of channel A.

In channel B, the incoming signal at terminal 1 is heterodyned with the 509.5 kc. line frequency resulting from the pulse output of modulator 14. The difference frequency output of mixer 6 results in an audio output extending from zero frequency to 9.5 kc. as shown by the curve of FIG. 8. Since filter 16 passes only those frequencies between approximately 5 kc. and 15 kc., the output of mixer 6 lying below 4.5 kc. is rejected and does not appear in the output of channel B.

The audio outputs of both channels are added together in adder network 15.

In the example chosen, the carrier at 500 kc. frequency was heterodyned in channel A to zero frequency and, therefore, does not appear in the output of that channel. The output of channel B, however, does have a converted carrier (viz., converted to a frequency of 9.5 kc.) plus some of the modulation components. In combining the signals from channels A and B in adder network 12, the resultant output of the adder network contains the converted carrier and the converted modulation components. The signal spectrum which originally resided in the 500 kc. to 515 kc. region has, by operation of the invention, been converted to the audio frequency region. In the audio frequency region, the signal is still a modulated carrier and is not merely a demodulation envelope. In order easily to detect the converted signal, the signal is reconverted to a higher frequency region and is then demodulated.

The system of FIG. 1 has band coverage limitations due to the fact that the spectrum of line frequencies is obtained from a pulse of high frequency energy. The wider the band which is to be monitored by that system, the narrower must be the pulse width. Assuming the amplitude of the pulse is unchanged, if the pulse width is made narrower (i.e., the pulse duration is reduced), the average power in the spectral line frequencies is decreased because the power in the pulse has been decreased. The power in the pulse is, in effect, distributed over the spectral line frequencies (see FIG. 4 for the amplitude distribution). Since a narrower pulse has more spectral line frequencies, the power of the pulse is distributed over more spectral lines and, consequently, the average power in the spectral lines is reduced. The average power of the spectral lines can be increased in the case of the narrower pulse by increasing the pulse amplitude. This technique is severely limited by the peak power which can be generated by the local oscillators and the ability of the assocated components to transmit and handle the high power involved.

An alternative embodiment of the invention is shown in FIG. 9 which employs the technique of frequency sweeping an oscillator to obtain a wider band width. If an oscillator is swept in sawtooth fashion through a range of frequencies a spectrum of line frequencies is generated. Since the oscillator is "on" during the entire time it is being swept through the desired frequency range, the average power generated during the sawtooth sweeps is considerably higher than the average power in the pulses generated by method of the embodiment of FIG. 1. The higher average power put out by the swept oscillator can be distributed across a larger number of spectral line frequencies thereby permitting the system of FIG. 9 to provide greater band coverage than can be obtained with the system of FIG. 1.

In the band folding system of FIG. 9, the incoming modulated R.F. signals at terminal 21 are applied to a band pass filter 22 which transmits only those signals occurring in the band of frequencies to be monitored. The signal output of the band pass filter is fed into mixer 23 in channel A and into mixer 24 in channel B. In channel A, the output of filter 22 is heterodyned in mixer

23 with a signal of frequency $f_c$ obtained from local oscillator 25. In channel B the output of filter 22 is heterodyned in mixer 24 with a signal of frequency $f_c^1$ obtained from local oscillator 26. Both local oscillators generate their signals continuously. The signal of local oscillator 16 is displaced in frequency from the frequency $f_c$ of oscillator 25 by an amount $\Delta f$. Because of that frequency displacement, the corresponding modulation products produced by mixer 23 and 24 are also separated in frequency by $\Delta f$. In channel A, the heterodyned R.F. signal output of mixer 23 is fed into another mixer 27 and in channel B the heterodyned R.F. signal output of mixer 24 is fed to a mixer 28.

In the system of FIG. 9, the spectrum of line frequencies, as previously discussed, is generated by causing a high frequency oscillator 29, such as a klystron or a travelling wave tube, to be periodically swept through a frequency range at a rate determined by a clock 30. The clock is preferably a crystal oscillator whose frequency is more than twice the rate of the highest frequency to be recorded. The clock is arranged to trigger a sweep generator 31 which thereupon generates a sawtooth signal causing oscillator 29 to be swept through a wide range of frequencies. In order that the sweep range shall be less than an octave, the input R.F. signals at terminal 21 are converted to a higher frequency range by heterodyning in mixers 23 and 24 with the signals obtained from local oscillators 25 and 26. Since at the higher frequencies the sweep of oscillator 29 can, because of the higher average power involved, cover a much wider spectrum than can the line frequencies produced by the rectangular pulses generated in the system of FIG. 1, the band width monitored by the FIG. 9 system can be materially greater than the band monitored by the system employing the pulse technique.

The swept frequency output of oscillator 29 is applied to mixers 27 and 28. In channel A, the swept frequency output of oscillator 29 is heterodyned in mixer 27 with the output of mixer 23. In channel B, the swept frequency output of oscillator 29 is heterodyned with the output of mixer 24. The outputs of channels A and B are coupled to a summation network 32. That network preferably is a simple resistive network and functions to additively combine the signal outputs of mixers 27 and 28. The output of adder network 32 is applied to a filter 33 which has a band width, approximately 5 kc. to 15 kc., for example, such that only the difference frequency output of mixers 27 and 28 are passed, The summed signals from channels A and B which proceed through band pass filter 33 appear at the output terminal 34 as a continuous audio frequency signal with a converted carrier and all of the modulation retained.

While several embodiments have been illustrated in the drawings, it should be understood that modifications can be made in those embodiments without departing from the essence of the invention. It is intended, therefore, that those embodiments shall be considered as illustrative of the invention whose scope is defined in the appended claims.

What is claimed is:

1. A band folding system comprising:

first and second signal channels;

means for applying signals from a band of frequencies to the inputs of the first and second channels;

each signal channel having a generator for producing simultaneously a spectrum of line frequencies covering the band being monitored and having a mixer for heterodyning the output of the generator with the signals applied to the channel's input;

means in the signal channels for causing the spectrum of line frequencies generated in one signal channel to be displaced in frequency from and interleaved with the spectrum of line frequencies generated in the other signal channel;

means for additively combining the outputs of the two signal channels, and filter means connected to filter the heterodyned signals developed in each channel, the interval between adjacent line frequencies being at least twice as great as the bandwidth of said filter means.

2. A band folding system comprising:

first and second signal channels;

means for applying signals from a band of frequencies to the inputs of the first and second channels;

each signal channel having heterodyning means for converting the channel's input signals to a different frequency range, each of said heterodyning means including a first mixer and a first generator which applies a single-frequency signal to said mixer, the first generator in the first channel having a different frequency from the first generator in the second channel;

a signal generator for simultaneously producing a spectrum of line frequencies;

each channel having a second mixer for heterodyning the line frequency spectrum of the signal generator with the output of the first mixer in said channel, thereby to provide at the output of each said second mixer for each input signal frequency a set of line frequencies, said second mixer being interleaved in frequency; and means for additively combining the outputs of said second mixers.

3. A band folding system comprising:

first and second signal channels;

means for applying signals from a band of frequencies to the inputs of said first and second channels;

heterodyning means in each channel, each heterodyning means including a mixer receiving the signal applied to the input of the channel, a local oscillator generating a single-frequency signal, means for amplitude-modulating said single-frequency signal to provide a simultaneous set of line frequencies, and applying said set of line frequencies to said mixer;

said constant-frequency oscillators being displaced in frequency from each other so that the set of line frequencies of the oscillator in said first channel is interleaved with that of the oscillator in said second channel; and means for additively combining the outputs of said signal channels.

4. The combination defined in claim 3 including audio-frequency band pass filters connected to filter the outputs of said mixers, the interval between adjacent line frequencies being at least twice as great as the bandwidth of said filters, said filters passing frequencies in the same band, whereby the output of said combining means simultaneously registers signals throughout said band of frequencies at the inputs of said first and second channels.

5. A band folding system comprising:

first and second signal channels;

means for applying signals from a band of frequencies to the inputs of said first and second channels;

a local generator;

heterodyning means in each channel for heterodyning the channel's input signal with the output of said local generator, said local generator delivering to said heterodyning means a signal having a simultaneous set of line frequencies;

the set of line frequencies produced by said generator in said first channel overlapping in frequency and being displaced in frequency from the set of line frequencies produced by said generator in said second channel; and means for additively combining the outputs of both signal channels.

6. A band folding system comprising:

first and second signal channels;

means for applying input signals from a band of frequencies to the inputs of the first and second channels;

means in each channel for heterodyning the channel's input signal with a simultaneous set of line frequencies obtained from a source providing a wide spectrum of line frequencies, whereby for each input signal each heterodyning means provides simultaneously a plurality of beat frequency signals at a set of beat frequencies corresponding to said set of line frequencies;

means causing the set of beat frequency signals of the first signal channel to be displaced in frequency from and interlaced in frequency with a set of beat frequency signals of the second signal channel, and means for additively combining the outputs of both signal channels.

7. The combination defined in claim 6 including band pass filter means connected to filter the set of beat frequency signals generated in each channel, the interval between adjacent line frequencies being at least twice as great as the bandwidth of said filter means.

References Cited by the Examiner

UNITED STATES PATENTS 2,954,465 9/1960 White ---------------- 325—333

DAVID G. REDINBAUGH, *Primary Examiner.*